US010802112B2

United States Patent
Swanson et al.

(10) Patent No.: US 10,802,112 B2
(45) Date of Patent: Oct. 13, 2020

(54) METHOD, DEVICE, AND SYSTEM FOR SIMULTANEOUSLY DETECTING DIFFERENT WEAPON THREATS USING REFLECTED RADAR RETURN SIGNALS

(71) Applicant: United States as Represeted By the Secratary of the Navy, San Diego, CA (US)

(72) Inventors: Paul David Swanson, Santee, CA (US); Jia-Chi S. Chieh, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 225 days.

(21) Appl. No.: 16/133,152

(22) Filed: Sep. 17, 2018

(65) Prior Publication Data
US 2020/0088842 A1    Mar. 19, 2020

(51) Int. Cl.
| G01S 7/41 | (2006.01) |
| G01S 7/35 | (2006.01) |
| G01S 13/88 | (2006.01) |
| G01S 13/06 | (2006.01) |

(52) U.S. Cl.
CPC ............ *G01S 7/411* (2013.01); *G01S 7/352* (2013.01); *G01S 13/06* (2013.01); *G01S 13/88* (2013.01)

(58) Field of Classification Search
CPC .......... G01S 7/411; G01S 7/352; G01S 13/88; G01S 13/06; G01S 13/42; G01S 13/343
USPC ........................................................ 342/147
See application file for complete search history.

(56) References Cited

U.S. PATENT DOCUMENTS

| 4,408,868 A | * | 10/1983 | Thomas ............... G03G 15/101 355/77 |
| 5,173,706 A | * | 12/1992 | Urkowitz ............... G01S 7/032 342/101 |
| 6,707,419 B2 | * | 3/2004 | Woodington ........ H01Q 21/065 342/200 |
| 8,049,659 B1 | | 11/2011 | Sullivan et al. |
| 8,362,945 B2 | | 6/2013 | Nguyen et al. |
| 8,547,274 B2 | | 10/2013 | Reinpoldt, III |
| 2009/0309782 A1 | * | 12/2009 | Takabayashi ......... G01S 13/343 342/105 |

(Continued)

OTHER PUBLICATIONS

Jiang et al., "Lens-coupled dual polarization sinuous antenna for quasi-optical terahertz balanced mixers," Microwave Conference Proceedings (APMC), 2012 Asia-Pacific, vol., no., pp. 52,54, Dec. 4-7, 2012.

(Continued)

*Primary Examiner* — Frank J McGue
(74) *Attorney, Agent, or Firm* — Naval Information Warfare Center, Pacific; Kyle Eppele; J. Eric Anderson

(57) ABSTRACT

A chirped radio frequency signal is transmitted across an area of a potential threat. A reflected radio frequency return signal from an open barrel of a weapon at a location within the area of the potential threat is received at an incident angle through an aperture. An antenna at a position in an antenna array detects the reflected radio frequency return signal received at the incident angle through the aperture. The position of the antenna within the antenna array corresponds to a direction from which the reflected radio frequency return signal originates.

19 Claims, 6 Drawing Sheets

(56) References Cited

U.S. PATENT DOCUMENTS

| | | | | |
|---|---|---|---|---|
| 2010/0309040 | A1* | 12/2010 | Rofougaran | H01Q 1/2283 342/104 |
| 2013/0130843 | A1* | 5/2013 | Burroughs | G01S 13/82 473/415 |
| 2016/0084943 | A1* | 3/2016 | Arage | G01S 13/42 342/102 |
| 2016/0349363 | A1* | 12/2016 | Millar | G01S 13/449 |
| 2016/0363664 | A1* | 12/2016 | Mindell | G01S 13/76 |

OTHER PUBLICATIONS

Liu et al., "A 200 GHz Schottky Diode Quasi-Optical Detector Based on Folded Dipole Antenna," 20th International Symposium on Space Terahertz Technology, 2009.

Liu et al., "A Broadband Quasi-Optical Terahertz Detector Utilizing a Zero Bias Schottky Diode," Microwave and Wireless Components Letters, IEEE , vol. 20, No. 9; pp. 504,506, Sep. 2010.

Liu et al., "Development of Integrated Terahertz Broadband Detectors Utilizing Superconducting Hot-Electron Bolometers," Applied Superconductivity, IEEE Transactions on , vol. 19, No. 3, pp. 282,286, Jun. 2009.

Zhang et al., "3D Imaging MillimeterWave Circular Synthetic Aperture Radar," Sensors 2017, 17, 1419, Jun. 2017.

\* cited by examiner

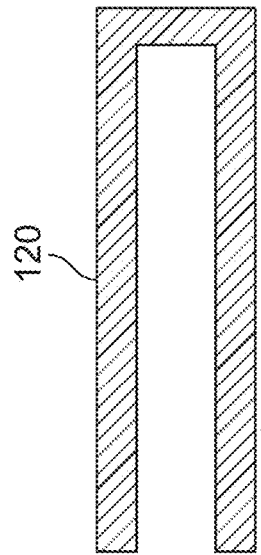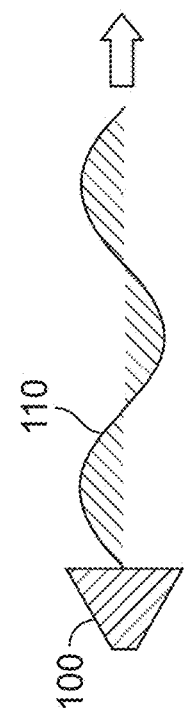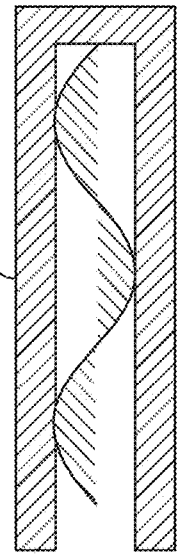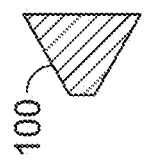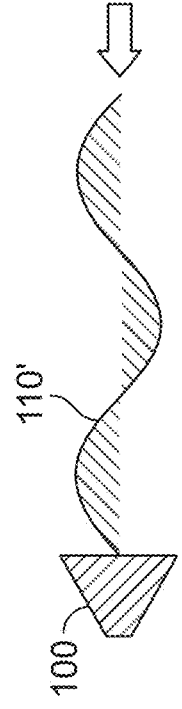
FIG. 1A (Prior Art)
FIG. 1B (Prior Art)
FIG. 1C (Prior Art)

METHOD, DEVICE, AND SYSTEM FOR SIMULTANEOUSLY DETECTING DIFFERENT WEAPON THREATS USING REFLECTED RADAR RETURN SIGNALS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103679.

FIELD OF THE INVENTION

The present disclosure pertains generally to detection of weapon threats. More particularly, the present disclosure pertains to simultaneously detecting different weapon threats using reflected radar return signals.

BACKGROUND

Modern advances in firearm threat detection have made it possible to detect firearm threats using electro-optical and acoustic systems. Many such systems use triangulation or other techniques to locate the source of a firearm based on a fired shot. Unfortunately, such approaches are not useful in detecting a firearm threat before a shot is fired. Thus, such approaches are not useful in protecting against damage caused by an initial shot.

Another proposed approach uses millimeter (mm) radar waves for firearm threat detection. In this approach, a focused radar signal is transmitted from a radar source at a location to an area of a potential threat. A threat is detected when a reflected radar return signal is received that corresponds to an open barrel of weapon pointed toward the location of the focused radar source.

This approach may be understood with reference to FIGS. 1A-1C. As shown in FIG. 1A, a radar signal 110A transmitted from a focused radar source 100 is directed toward the open end of a gun barrel 120. As shown in FIG. 1B, the radar signal enters the open end of the gun barrel 120 and is reflected by the closed end. As shown in FIG. 1O, a reflected radar signal 110' is returned from the open end of the gun barrel 120. Detection of the reflected radar return signal 110' indicates there is a threat of a gun being pointed at or near the location of the focused radar source 110A.

The effectiveness of this approach is limited as the speed of detection of weapons depends on the rate at which the radar source can be moved to scan in all directions. Additionally, the bearing and elevation of a single weapon cannot be accurately determined using this approach, let alone the bearing and elevation of multiple weapons.

In view of the above, it would be desirable to simultaneously detect different weapon threats at different locations, before a shot is fired.

SUMMARY

According to an illustrative embodiment, a chirped radio frequency signal is transmitted across an area of a potential threat. A reflected radio frequency return signal from an open barrel of a weapon at a location within the area of the potential threat is received at an incident angle through an aperture. An antenna at a position in an antenna array detects the reflected radio frequency return signal received at the incident angle through the aperture. The position of the antenna within the antenna array corresponds to a direction from which the reflected return radio frequency signal originates.

These, as well as other objects, features and benefits will now become clear from a review of the following detailed description, the illustrative embodiments, and the accompanying drawings.

BRIEF DESCRIPTION OF THE DRAWINGS

The novel features of the present disclosure will be best understood from the accompanying drawings, taken in conjunction with the accompanying description, in which similarly-referenced characters refer to similarly-referenced parts, and in which:

FIGS. 1A-1C illustrate how a radar signal transmitted toward an open barrel of a weapon is reflected from the weapon.

DETAILED DESCRIPTION OF THE EMBODIMENTS

According to illustrative embodiments, a chirped radio frequency signal is transmitted across an area of a potential threat. Reflected radio frequency return signals from open barrels of weapons located within the area of the potential threat are simultaneously received at incident angles through an aperture. For each reflected radio frequency return signal, an antenna at a position in an antenna array detects the reflected radio frequency return signal received at the incident angle through the aperture. The position of the antenna within the antenna array corresponds to a direction from which the reflected return radio frequency signal originates. Based on the direction from which each of the reflected return radio frequency signal originates and a bandwidth of the transmitted chirped radio frequency signal, the elevation and bearing of each of the weapons may be determined without requiring that a shot be fired.

Figure 2:
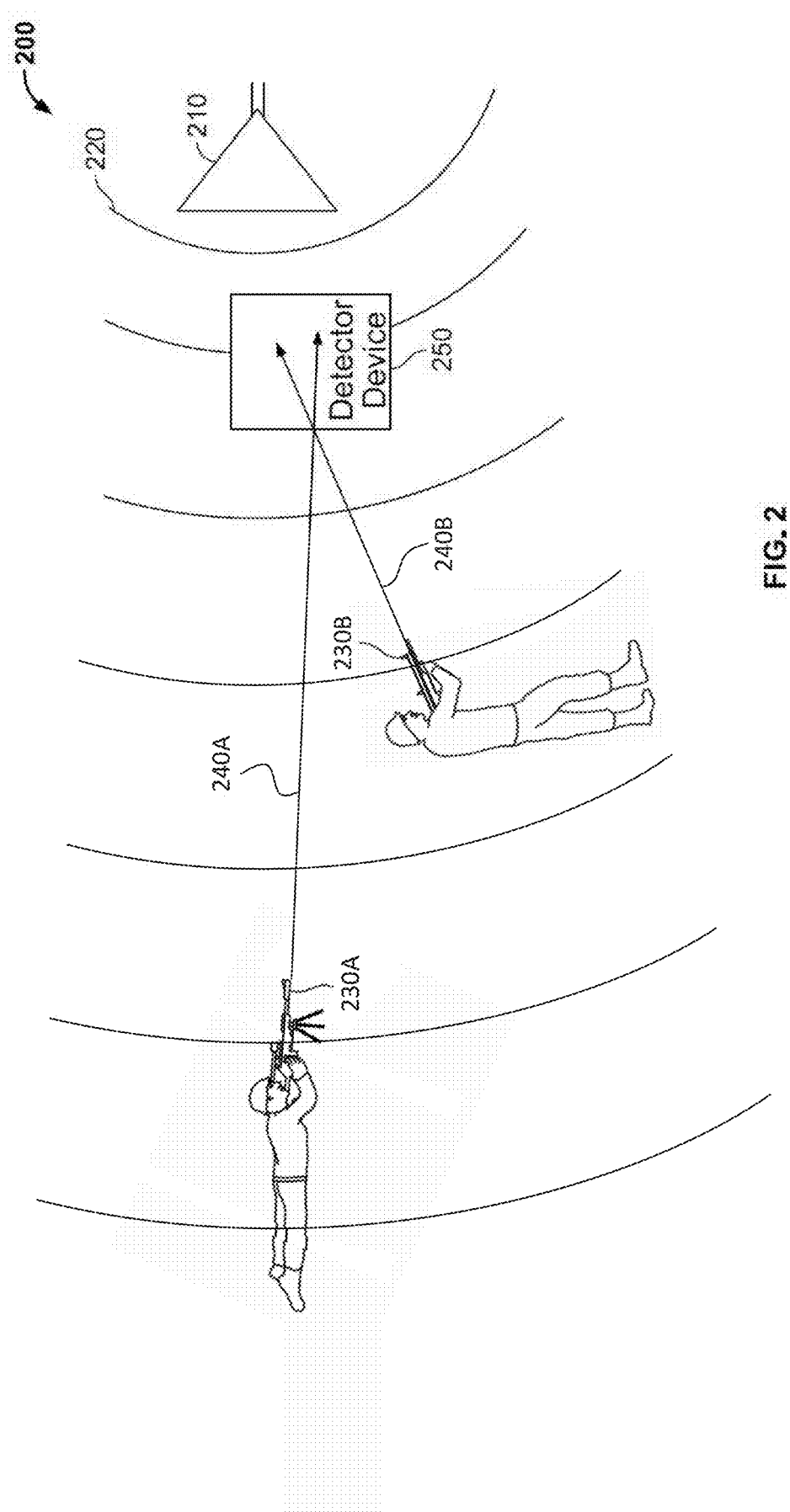
FIG. 2 illustrates a system for detecting weapon threats according to an illustrative embodiment.

FIG. 2 illustrates a system for detecting weapon threats according to an illustrative embodiment. As shown in FIG. 2, the system 200 includes a radar source 210 configured to generate and transmit a chirped radio frequency signal, e.g., a millimeter (mm) wavelength signal, such as a radar signal 220. The chirped radar signal 220 is broadcast at a constant power level across an area of a potential threat, i.e., the area encompassing the locations of the weapons 230A and 230B. The area of the potential threat across which the chirped radar signal 220 is broadcast may encompass, for example, hundreds of meters surrounding the radar source 210, in compliance with government radiation safety limits. A location of a weapon (determined as described below) may encompass centimeters within the area of the potential threat. The weapons may include, for example, an assault rifle, such as an AK47, a machine gun, such as an M249, and other weapons having an open barrel at one end.

The chirped radar signal 210 includes a periodic sweep of millimeter wavelengths, as shown in detail in FIG. 4A, which is described in more detail below. The chirped radar signal 210 covers resonant frequencies of weapon barrels of interest. When the transmitted chirped radar signal 210 hits the open barrel of a weapon, a radar signal is reflected as the chirped radar signal passes the resonant frequency of the open barrel.

The wavelengths in the chirped radar signal 210 correspond to barrel diameters of weapons. Wavelengths of the chirped radar signal 210 that can travel down the lengths of open barrels of the weapons 230A and 230B are reflected back as reflected radar return signals 240A and 240B, respectively. Examples of reflected radar return signals are shown in FIGS. 4C and 4D, respectively, which are described in more detail below.

The barrel of a weapon is a millimeter-wave waveguide that will only support resonant wavelengths that evenly fit within the barrel's inner diameter. Thus, an open barrel acts as a band pass filter, only reflecting radar signals at its resonant wavelengths. The reflected radar return signals 240A and 240B will exit the open barrels of the weapons 230A and 230B in directions in which the weapons 230A and 230B are pointed.

Figure 3:
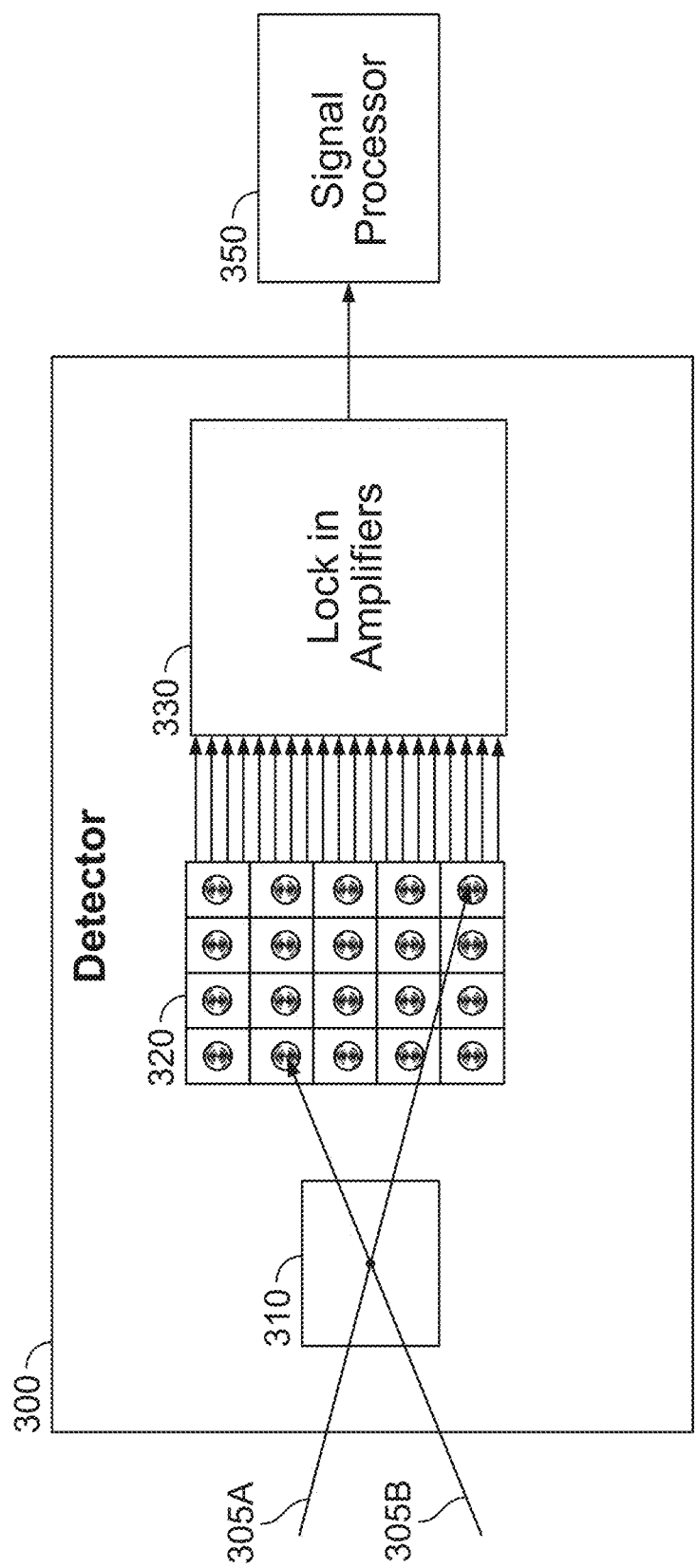
FIG. 3 illustrates details of a detector device according to an illustrative embodiment.

The system 200 also includes a detector device 250 including a spatial aperture and a two-dimensional array including a plurality of antennas (shown in detail in FIG. 3). The detector 250 is configured to receive the reflected return radar signals 240A and 240B at different incident angles. The bandwidth of the chirped radar signal, as reflected by each of the open barrels of the weapons 230A and 230B, is proportional to the range resolutions or the distances of each of the open barrels to the detector 250. For that reason, according to an illustrative embodiment, a wideband transmitted chirped radar signal is used.

As noted above, the chirped radar signal 210 is transmitted at a constant transmit power level. The reflected return radar signals 240A and 240B have power levels that are different from the constant power level, triggering measurement of phase shifts in the reflected return radar signals by a plurality of lock-in amplifiers. This is described in more detail below.

Different types of weapons have different barrel diameters. Thus, each of the reflected radar return signals 240A and 240B will have a resonant frequency that corresponds to a type of the weapon having a particular barrel diameter. Based on the resonant frequencies of the reflected radar return signals 240A and 240B, the types of the weapons 230A and 230B may be determined, as described in more detail below.

FIG. 3 illustrates details of a detector device according to an illustrative embodiment. The detector device 300 shown in FIG. 3 includes a spatial aperture 310 through which reflected radar signals 305A and 305B are received at different incident angles.

The reflected return radar signals 305A and 305B that are received through the spatial aperture 310 are detected by an antenna array 320. The spatial aperture 310, which may be included in a camera, is configured to receive a reflected radar return signal at an incident angle from an open barrel of a weapon pointed toward the detector device in response to a transmitted chirped radar signal. The spatial aperture 310 may be a pin-hole lens that is approximately a few millimeters in diameter. The pin-hole lens (approximately 3 mm diameter) maintains perfect focus and acts as a spatial filter.

The detector device also includes a millimeter-wave detector array 320. The detector array 320 is two dimensional array of closely spaced antennas. Each antenna is coupled to a diode, as explained in further detail below with reference to FIG. 5.

Using an array of antennas instead of a single antenna is advantageous, as a single antenna must be raster-scanned to detect reflected return radar signals over a field of view. According to an illustrative embodiment, an array of antennas 320 is used to view a full area of a potential threat instantaneously. The spatial aperture 310 focuses the view of the area onto the antenna array 320.

Each antenna in the antenna array 320 is configured to detect an individual reflected radar return signal received at an incident angle through the spatial aperture 310. The antennas are spaced apart at positions within the antenna array 320 such that a position of an antenna that detects the reflected radar return signal received through the spatial aperture at the incident angle corresponds to a direction from which the reflected radar return signal originates.

A reflected radar return signal that has the same periodicity as the transmitted chirped radar signal indicates a threat. According to an illustrative embodiment, the spatial aperture 310 only illuminates the antenna in the antenna array 320 that is at a position through which the reflected radar return signal received at an incident angle passes, providing direction information of an open barrel of a weapon. The direction of an open barrel of a weapon may thus be defined by the incident angle at which the reflected return radar is received and the position of the antenna in the array that detects the reflected return radar signal. That is, the incident angle corresponds to the elevation of the weapon. Range information may be determined from a time of arrival of the reflected return radar signal, based on the phase shifts of the reflected radar return signal. The range information corresponds to the bearing of the weapon. Thus, according to illustrative embodiments, both the elevation and the bearing of a weapon may be determined based on a reflected return radar signal.

The detector device 300 also includes lock-in amplifiers 330. Each of the lock-amplifiers 330 is associated with a respective antenna in the antenna array 320. Each of the lock-in amplifiers 330 is configured to determine a phase shift of the individual reflected radar return signal detected by the associated respective antenna within the antenna array 320 with respect to the transmitted chirped radar signal.

Lock-in amplification uses phase-sensitive detection to measure the magnitude and phase of any signal repeating itself at a reference frequency. Lock-in amplification also compensates for lost power caused by the spatial aperture 310. Noise and any signals at frequencies other than the reference frequency are rejected and do not affect the measurement. Thus, lock-in amplification extracts low level signals from noise In most circumstances, reflected return radar signals that are one million times smaller than the background noise can be detected.

Each lock-in amplifier detects a phase shift of the reflected radar return signal with respect to the transmitted chirped radar signal using a reference signal that has a pattern that repeats at the same period as the transmitted chirped radar signal. This may be understood with reference to FIGS. 4A-4D.

Figure 4A:
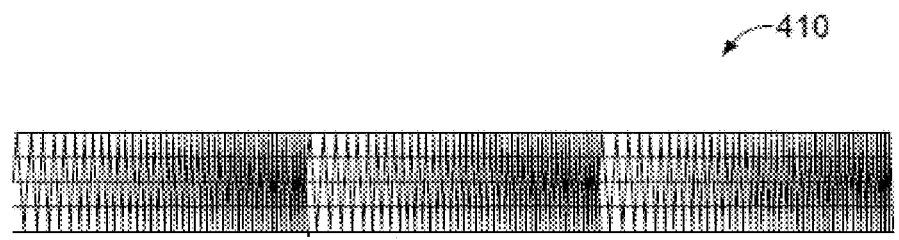
FIG. 4A illustrates an example of a transmitted chirped radar signal with periodically varying wavelengths according to an illustrative embodiment.
Figure 4B:
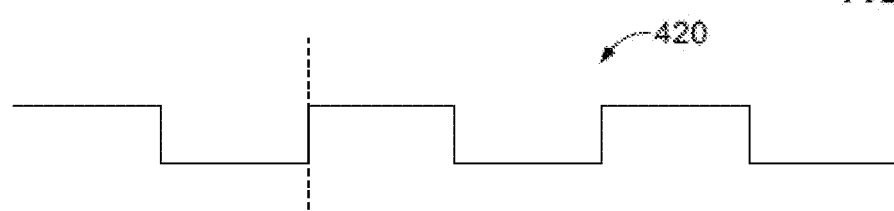
FIG. 4B illustrates an example of a lock-in reference signal according to an illustrative embodiment.
Figure 4C:
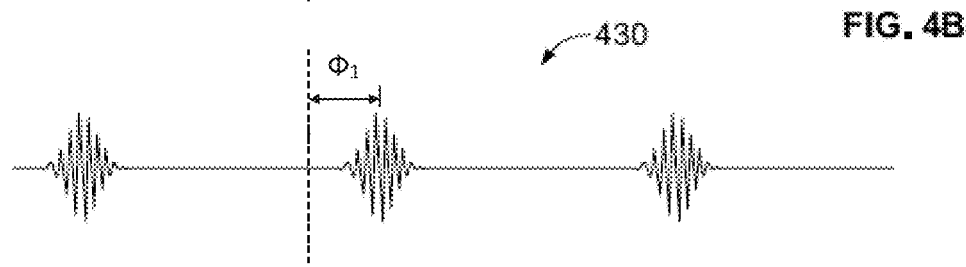
FIGS. 4C and 4D illustrate examples of reflected radar return signals from open weapon barrels having different diameters according to an illustrative embodiment.
Figure 4D:
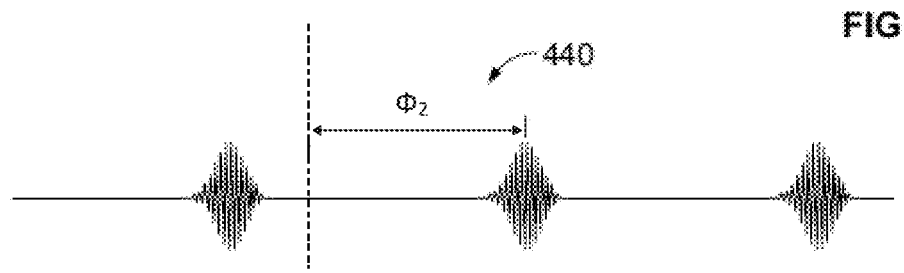

FIG. 4A depicts an example of a transmitted chirped radar signal 410 that includes a periodic sweep of millimeter wavelengths, at least some of the wavelengths corresponding to resonant frequencies of open barrels of weapons. FIG. 4B depicts an example of a reference signal 420. As can be seen from FIGS. 4A and 4B, the reference signal 420 has a pattern that repeats at the same period as the transmitted chirped radar signal 410.

FIGS. 4C and 4D depict examples of reflected radar return signals 430 and 440, respectively. As can be seen from FIG. 4C, the reflected radar return signal 430 has a phase shift $\phi_1$ with respect to the beginning of each sweep of the transmitted chirped radar signal 410. The reflected return radar signal 440 has a phase shift $\phi_2$ with respect to the beginning of each sweep of the transmitted chirped radar signal 410. These phase shifts may be determined by a lock-in amplifier by determining where rectified direct current (DC) signals that correspond to the reflected radar return signals occur relative to the beginning of the repeated pattern of the reference signal 420.

Based on the phase shift of a reflected radar return signal, as determined by a lock-in amplifier, the approximate wavelength of the reflected radar return signal can be determined (with a slight uncertainty due to round trip travel time). Referring again to FIG. 3, this determination may be made by a signal processor 350 that has knowledge of the frequency band and wavelengths of the transmitted chirped radar signal.

Based on the wavelength of the reflected radar return signal, the barrel diameter of an open barrel of a weapon from which the reflected radar return signal is received can be determined, as only certain wavelengths can pass down a given barrel. This determination can also be made by the signal processor 350.

As wavelength is inversely proportional to frequency, the resonant frequency of the reflected radar return signal may be determined, e.g., by the signal processor 350, based on the approximate wavelength of the reflected radar return signal. By varying the period of the frequency variation, after a reflected radar return signal is detected, the barrel diameter/resonant frequency and the range of the weapon can be accurately determined from the phase shift alone. Based on the resonant frequency, the type of the weapon can be determined using the signal processor 350, using a lookup table of resonant frequencies for different types of weapons.

The signal processor 350 may include a memory for storing information, such as the frequency band and wavelengths of the transmitted chirped radar signal, barrel diameters of weapons, a lookup table of resonant frequencies corresponding to different types of weapons, and/or computer-readable instructions for executing the operations described above. The signal processor may also include a processor for executing the operations described above.

Turning now to details of the antennas included in the antenna array, to obtain a long range resolution, a broadband antenna is preferred. This is because in radar systems, the range resolution is proportional to the bandwidth of the signal (can be a chirp). The range resolution is defined as:

$$\text{Range Resolution} = \frac{c}{2*BW}$$

where c is the speed of light and BW is the bandwidth. For this reason, wide bandwidths can result in higher range resolution. Although many types of broadband antennas can be used, according to one illustrative embodiment, a sinuous antenna is used. Not only do sinuous antennas have broadband characteristics, but they also have planar attributes which make fabrication easier.

Figure 5:
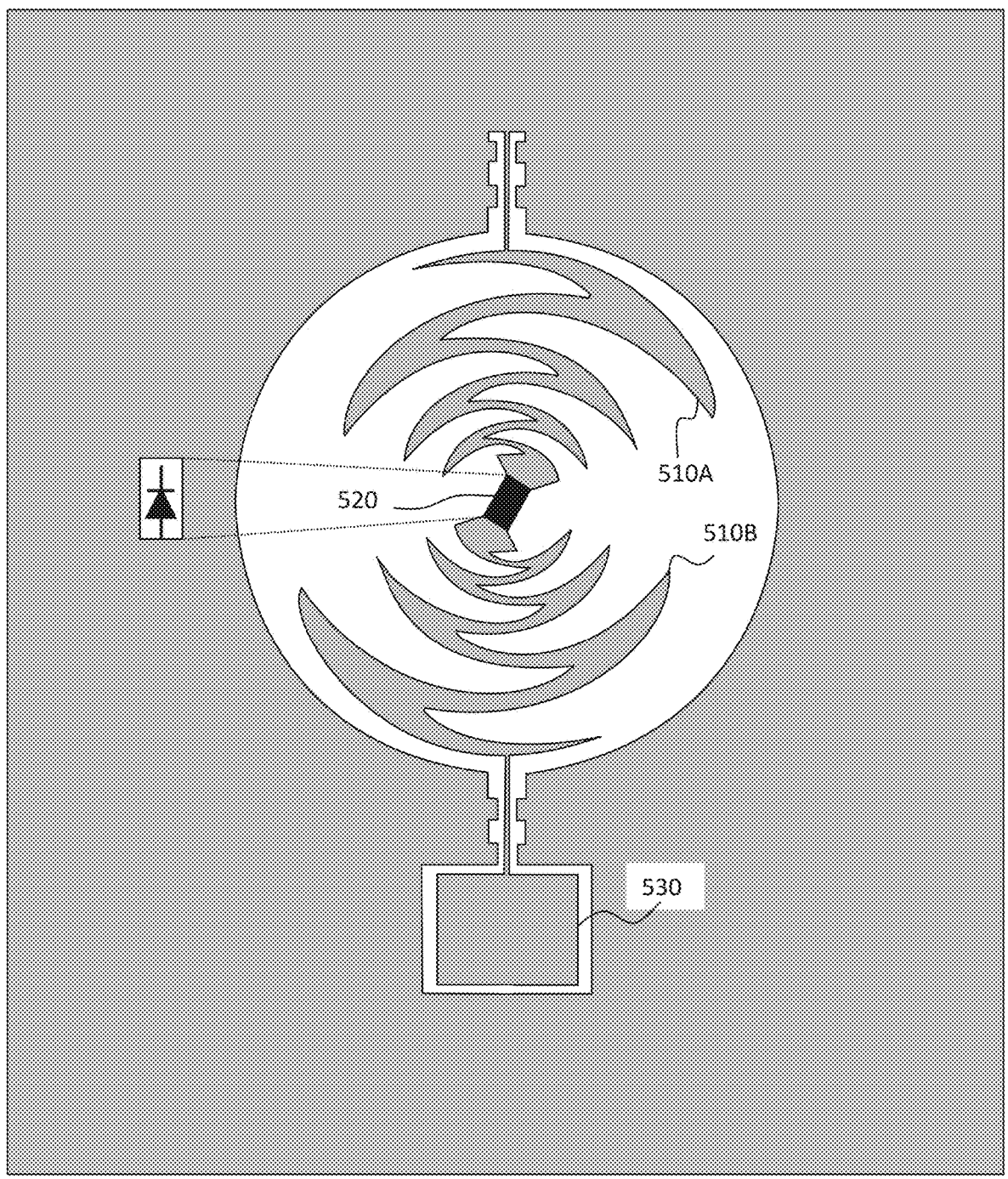
FIG. 5 illustrates details of a single antenna included in an antenna array according to an illustrative embodiment.

FIG. 5 illustrates details of a single antenna included in an antenna array according to an illustrative embodiment. Although FIG. 5 depicts a sinuous antenna, it should be appreciated that any broadband radiating element could be used. According to an illustrative embodiment, a sinuous antenna having arms 510A and 510B is configured to receive an individual reflected radar signal having a resonant frequency f.

The active region for the sinuous antenna is given by:

$$r = \frac{\lambda}{4(\alpha + \delta)}$$

where $\alpha$ is the angular breadth, $\delta$ is the offset, r is the radius and $\lambda$ is the wavelength.

The impedance of the antenna is given by:

$$Z = \frac{\eta/4}{\sin(\pi/n)}$$

where $\eta$ is the free space impedance (e.g., 377 Ohms), and n is the number of turns.

As can be seen from FIG. 5, a diode detector 520 is mounted between the sinuous arms 510A and 510B. A reflected radar return signal received by the antenna arms 510A and 510B is received at a different power level than the transmitted chirped radar signal. The reflected radar return signal is rectified to a DC signal by the diode detector 520. The diode detector 520 provides a DC signal that is proportional to the amplitude of the reflected radar return signal to the lock-in amplifier associated with the antenna via a DC pad 530. The rectified DC signal "triggers" the lock-in amplifier to determine the phase shift of the reflected radar return signal relative to the beginning of the sweep of the transmitted chirped radar signal by determining where the DC signal occurs relative to the beginning of the repeated pattern of the reference signal, as described above.

According to an illustrative embodiment, a sinuous antenna may be formed as a metal pattern on a quartz substrate. This antenna may be designed as a broadband antenna that is well matched from 70-100 gigahertz (GHz). Return loss of the antenna may be optimized for better matching.

Figure 6:
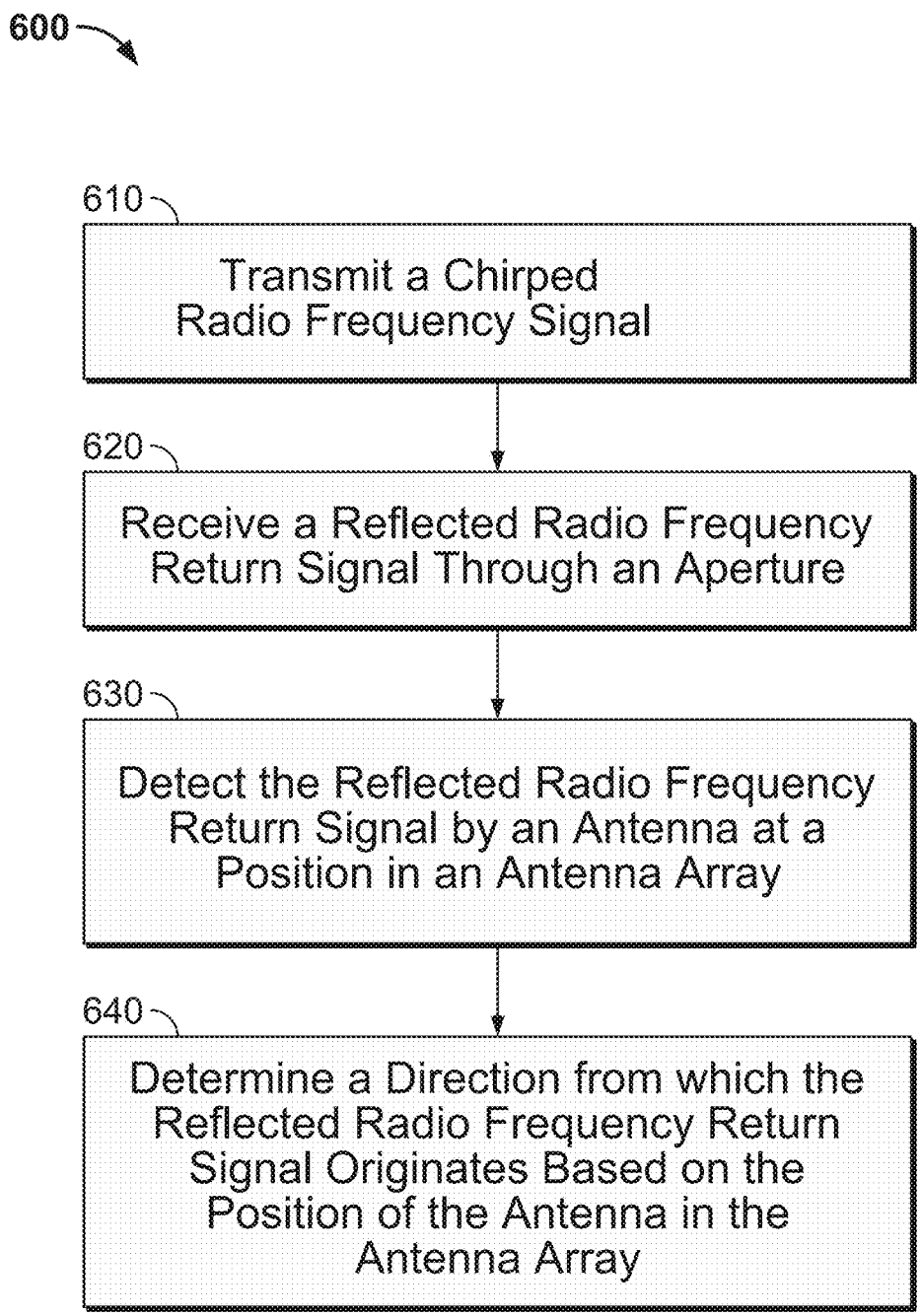
FIG. 6 is a flow chart depicting a method for detecting a weapon threat according to an illustrative embodiment.

FIG. 6 is a flow chart showing steps of a method for detecting a weapon threat according to an illustrative embodiment. It should be appreciated that fewer, additional, or alternative steps may also be involved in the method and/or some steps may occur in a different order.

Referring to FIG. 6, the method 600 begins at step 610 at which a chirped radio frequency signal is transmitted. This step may be performed by a radar source, such as the radar source 210 shown in FIG. 2.

At step 620, a reflected radio frequency return signal is received from an open weapon barrel at an incident angle through an aperture, such as the aperture 310 shown in FIG. 3. At step 630, the reflected radio frequency return signal is detected by an antenna at a position in the antenna array, such as an antenna in the antenna array 520. The position of the antenna in the antenna array corresponds to a direction from which the reflected radio frequency return signal originates.

At step 640, a direction from which the reflected radio frequency return signal originates is determined based on the position of the antenna in the antenna array. This step may be performed by a signal processor 350.

Steps 620-640 shown in FIG. 6 may be performed to simultaneously detect multiple weapon threats in the area of the potential threat using the same transmitted chirped radio frequency signal. That is, step 620 may be performed to receive another reflected radio frequency return signal from another open weapon barrel at another incident angle through the aperture. Step 630 may be performed to detect the other reflected radio frequency return signal by another antenna at another position in the antenna array. The other position of the other antenna in the antenna array corresponds to another direction from which the other reflected radio frequency return signal originates. Thus, step 640 may be performed to determine the other direction from which the other reflected radio frequency return signal originates.

Also, although not shown, the method 600 may include additional steps for determining the phase shift, determining the barrel diameter of a weapon based on the wavelength of the reflected return radio frequency signal, and determining the type of weapon based on the resonant frequency of the reflected radio frequency signal, as described above.

Although in the embodiments described above, a transmitted chirped radar signal is broadcast in all directions from a radar source, it should be appreciated that, to save power, the chirped radar signal may be transmitted across a narrower transmission angle and swept back and forth across the area of the potential threat.

Further, although in the embodiments described above, a reflected radar return signal is received by only one antenna in the antenna array 320, it should be appreciated that the reflected radar return signal may be received by more than one antenna by increasing the size of the spatial aperture and/or the distance from the spatial aperture to the antenna array. The output of the antennas may be fit to a Gaussian beam profile by the signal processor 350 to determine the incident angle of the reflected radar return signal. This may provide a more accurate incident angle and thus a more accurate indication of the elevation of the open barrel of the weapon.

It will be understood that many additional changes in the details, materials, steps and arrangement of parts, which have been herein described and illustrated to explain the nature of the invention, may be made by those skilled in the art within the principle and scope of the invention as expressed in the appended claims.

We claim:

1. A method, comprising:
    transmitting a chirped radio frequency signal across an area of a potential threat from open-barrel weapons, wherein the transmitted chirped radio frequency signal includes a periodic sweep of millimeter wavelengths, at least some of said millimeter wavelengths corresponding to resonant frequencies of open barrels of weapons;
    receiving, at an incident angle through a pin-hole aperture, a reflected radio frequency return signal from an open barrel of a weapon at a location within the area of the potential threat; and
    detecting, by an antenna at a position in an antenna array disposed behind the aperture, the reflected radio frequency return signal received at the incident angle through the aperture, wherein the antenna array is disposed at a fixed position relative to the aperture and wherein the position of the antenna within the antenna array corresponds to a direction from which the reflected return radio frequency signal originates.

2. The method of claim 1, further comprising determining, based on the position of the antenna within the antenna array, the direction from which the reflected radio frequency return signal originates.

3. The method of claim 2, further comprising determining, based on the direction from which the reflected radio frequency return signal originates, the location of the weapon.

4. The method of claim 1, wherein the transmitted chirped radio frequency signal is a radar signal.

5. The method of claim 1, further comprising:
    determining a phase shift of the reflected return radio frequency signal with respect to the transmitted radio frequency signal; and
    determining range information of the weapon based on the phase shift.

6. The method of claim 1, wherein the reflected radio frequency return signal has a resonant frequency within a frequency band of the transmitted chirped radio frequency signal.

7. The method of claim 6, further comprising determining a type of the weapon based on the resonant frequency of the reflected radio frequency return signal.

8. The method of claim 1, further comprising:
    receiving, at another incident angle through the aperture, another reflected radio frequency return signal from another open barrel of another weapon at another location within the area of the potential threat; and
    detecting, by another antenna at another position in the antenna array, the other reflected radio frequency return signal received at the other incident angle through the aperture, wherein the other position of the other antenna within the antenna array corresponds to another direction from which the other reflected return radar signal originates.

9. A weapon detection device, comprising:
    a camera having a spatial, pin-hole aperture configured to receive a reflected radar return signal at an incident angle from an open barrel of a weapon pointed toward the device in response to a transmitted chirped radar signal;
    an antenna array, disposed at a fixed distance relative to the spatial pin-hole aperture, comprising a plurality of antennas, each antenna configured to detect an individual reflected radar return signal received through the spatial, pin-hole aperture, wherein the antennas are spaced apart at positions within the antenna array such that a position of an antenna that detects the reflected radar return signal received through the spatial, pin-hole aperture at the incident angle corresponds to a direction from which the reflected radar return signal originates.

10. The device of claim 9, wherein the direction from which the reflected radar return signal originates corresponds to a location of the weapon.

11. The device of claim 9, further comprising a plurality of lock-in amplifiers, wherein each lock-in amplifier is associated with a respective antenna in the antenna array.

12. The device of claim 11, wherein each lock-in amplifier is configured to determine a phase shift of the individual reflected radar return signal detected by the associated respective antenna within the antenna array with respect to the transmitted chirped radar signal.

13. The device of claim 12, wherein the transmitted chirped radar includes a periodic sweep of wavelengths, at least some of said wavelengths corresponding to resonant frequencies of open barrels of weapons.

14. The device of claim 13, wherein the reflected radar return signal received through the spatial aperture at the incident angle has a phase shift with respect to the transmitted chirped radar signal that corresponds to a barrel diameter of the weapon.

15. The device of claim 9, wherein the plurality of antennas includes sinuous antennas.

16. A weapon detector comprising:
- a radar source configure to transmit, at a constant power level, over an area of potential threat, a chirped radar signal having a millimeter wavelength that corresponds to a resonant frequency of an open-ended barrel of a weapon;
- a pin-hole lens disposed with respect to the radar source so as to receive radio frequency (RF) return signals reflected from the weapon in the area of potential threat;
- a two-dimensional antenna array disposed behind the pin-hole lens, wherein the antenna array comprises a plurality of antennas that are spaced apart such that incoming RF return signals from different directions within the area of potential threat will be respectively focused by the pin-hole lens on different antennas within the antenna array;
- a plurality of lock-in amplifiers, wherein each lock-in amplifier is operatively coupled to a respective antenna in the antenna array and configured to determine a phase shift, with respect to the chirped radar signal, of any RF return signal received by the respective antenna;
- a signal processor configured to determine range information from a time of arrival of the RF return signal based on the phase shift of the RF return signal with respect to the chirped radar signal, wherein the signal processor is further configured to calculate an elevation of the weapon based on an incident angle at which the RF return signal is received at the pin-hole lens and the position of the antenna in the antenna array that detects the RF return signal after passing through the pin-hole lens.

17. The weapon detector of claim 16, wherein the chirped radar signal includes a periodic sweep of resonant frequencies of barrels of known weapons.

18. The weapon detector of claim 17, wherein the plurality of lock-in amplifiers use a reference signal that has a pattern that repeats at the same period as the chirped radar signal.

19. The weapon detector of claim 18, wherein each antenna in the antenna array comprises two sinuous arms and a diode mounted therebetween, wherein each diode is operatively coupled to the respective lock-in amplifier.

\* \* \* \* \*